(12) United States Patent
Heide et al.

(10) Patent No.: US 6,181,273 B1
(45) Date of Patent: Jan. 30, 2001

(54) RADAR DISTANCE SENSOR

(75) Inventors: Patric Heide, Neubiberg; Martin Nalezinski, München, both of (DE)

(73) Assignee: Siemens Aktiengesellschaft, Munich (DE)

(*) Notice: Under 35 U.S.C. 154(b), the term of this patent shall be extended for 0 days.

(21) Appl. No.: 09/341,502

(22) PCT Filed: Jan. 26, 1998

(86) PCT No.: PCT/DE98/00230
§ 371 Date: Jul. 12, 1999
§ 102(e) Date: Jul. 12, 1999

(87) PCT Pub. No.: WO98/34129
PCT Pub. Date: Aug. 6, 1998

(30) Foreign Application Priority Data

Jan. 29, 1997 (DE) .............................. 197 03 237

(51) Int. Cl.[7] .................................................. G01S 13/26
(52) U.S. Cl. .................. 342/130; 342/131; 342/135; 342/132
(58) Field of Search .................. 342/130, 131, 342/129, 135, 132, 128

(56) References Cited

U.S. PATENT DOCUMENTS

| | | | |
|---|---|---|---|
| 4,744,040 | * 5/1988 | Kawata et al. | 342/124 X |
| 5,337,052 | 8/1994 | Lohrmann et al. | 342/68 |
| 5,598,130 | * 1/1997 | Mesuda et al. | 332/119 |
| 5,659,321 | * 8/1997 | Burger et al. | 342/124 |
| 5,920,281 | * 7/1999 | Grace | 342/165 |
| 6,087,833 | * 7/2000 | Jackson | 324/348 |

FOREIGN PATENT DOCUMENTS

| | | |
|---|---|---|
| 195 33 125 C1 | 1/1997 | (DE). |
| 0 527 443 A2 | 2/1993 | (EP). |
| WO 83/0283 | 8/1983 | (WO). |

OTHER PUBLICATIONS

Saito, T. et al, "An FM–CW Radar Module With Front–end Switching Heterodyne Receiver", International Microwave Symposium Digest, Albuquerque, Jun. (1992), vol. 2, No. 1, pp. 713–716.

* cited by examiner

Primary Examiner—John B. Sotomayor
(74) Attorney, Agent, or Firm—Schiff Hardin & Waite

(57) ABSTRACT

Microwave radar: an additional modulation of the microwave signal (s (t)) provided for the emission or of the reception signal (e (t)) makes it possible to separate the payload signal from the noise signal parts in a following demodulation and filter unit (HP, MI2, TP). To this end, a modulation unit (MO, RG) for suitably modulating the signal to be emitted is provided preceding the antenna (A). The undesired noise signals produced by the components of the radar sensor itself are not modulated and can therefore be separated from the payload signal by filtering. This separation ensues after a raw measured signal (mess' (t)) has been generated by mixing transmission and reception signal (MI). A renewed demodulation with the modulation signal (r t)) of the modulation unit supplies the final measured signal (mess2 (t)) determinant for the determination of the distance, whereby the noise signals are previously removed by high-pass filtering and/or are subsequently removed by low-pass filtering.

4 Claims, 4 Drawing Sheets

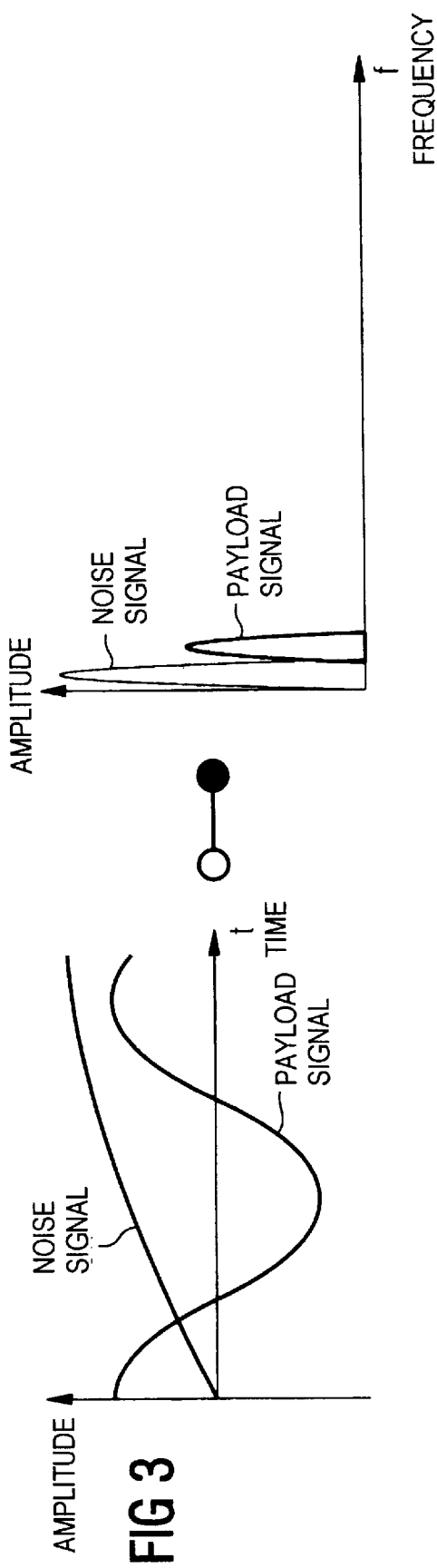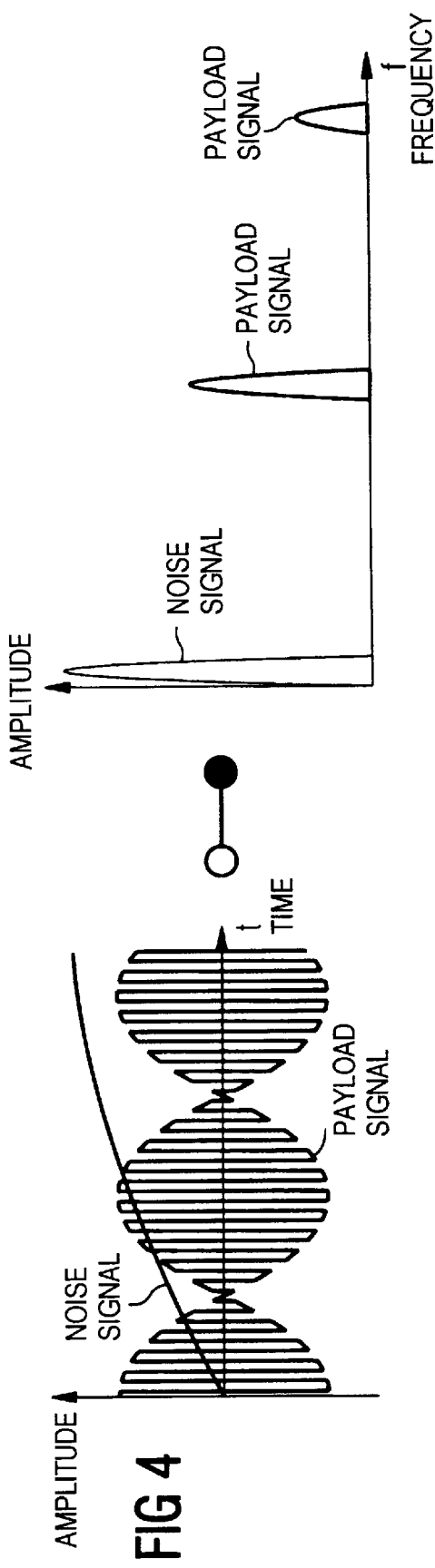

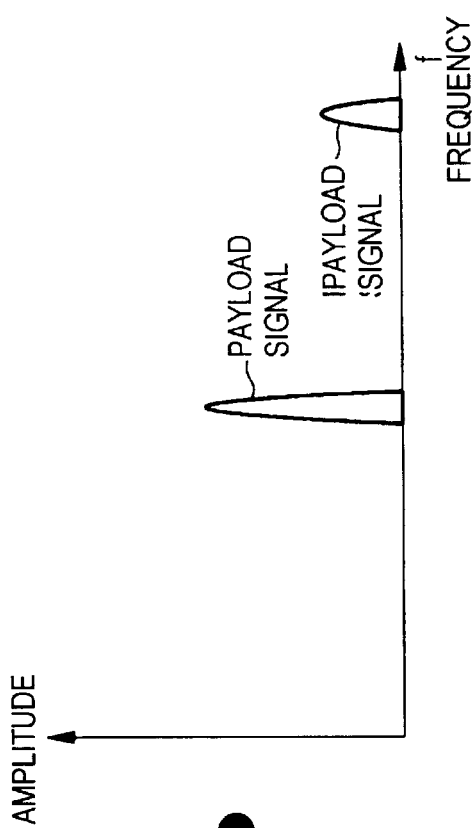
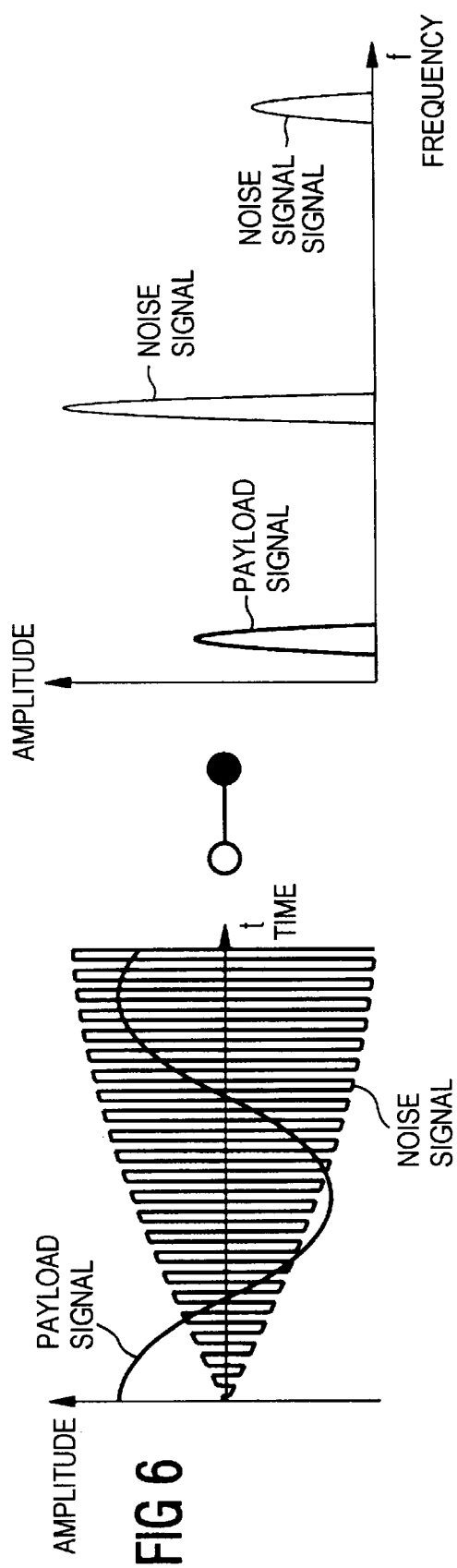

RADAR DISTANCE SENSOR

BACKGROUND OF THE INVENTION

The present invention is directed to a near-range radar distance sensor upon employment of microwave signals.

A basic task of sensor technology is the non-contacting, precise measurement of distances. Due to their rugged nature and dependability, particularly under difficult conditions of use, microwave radar sensors offer critical advantages compared to other sensors that work ultrasound or optical methods. Microwave radar sensors are therefore suitable for versatile applications such as, for example, for non-contacting measurement of range and velocity in automation technology or in automotive technology. A number of distance sensors according to the radar principle are known and described in textbooks. A particularly preferred embodiment works according to the FMCW Principle (Frequency Modulated Continuous Wave). An example of such a radar distance sensor is schematically illustrated in FIG. 2. The sensor emits a preferably linearly frequency-modulated transmission signal s (t) via the antenna A, this transmission signal s (t) being supplied by an electronically tunable microwave oscillator VCO. The reception signal e (t) received by the antenna is delayed in time relative to the transmission signal corresponding to the running time to the target and back and has a different momentary frequency dependent on running time compared thereto. A separation between the transmission signal and the reception signal in this indicated example is effected by a transmission/reception diplexer SEW. Such a transmission/reception diplexer can, for example, be formed by a circulator. An alternative is the employment of separate antennas for the transmission and reception (bistatic radar system). The measured signal mess (t) is generated by mixing the transmission signal s (t) and the reception signal e (t), for example in a mixer MI, and corresponds to the product of transmission signal and reception signal. The measured signal mess (t) arising during the mixing process has the difference frequency between the transmission signal s (t) and the reception signal e (t) as frequency. This frequency (or, respectively, the phase boost) of the measured signal mess (t) is proportional to the distance given such a sensor.

In practice, such distance sensors have technologically conditioned weaknesses in the near range, i.e. for extremely short distances to be measured. Due to unavoidable crosstalk because of the non-ideal separation of transmission signal and reception signal (e (t) contains parts of s (t)), noise/ multiple reflections within the sensor, reactances of the frequency modulation onto the components of the sensor and low-frequency amplitude/phase noise of the sensor components, the sensitivity of such sensors is highly limited in the near range, i.e. the internal noise signals of the sensor superimpose a payload signal produced by a target in the near range to such an extent that the measured signal supplies no usable range information. U.S. Pat. No. 5,337, 052 discloses a radar sensor that employs phase-modulated microwaves and is provided for identifying the presence of a target in a specific distance range. Existing noise is eliminated from the measurement with a special digital code of the phase modulation.

DE 195 33 125 C1 discloses an apparatus for distance measurement wherein a transit time line is employed as delay line for improving the precision of the distance measurement in the near range. A frequency-modulated signal is converted with a further microwave signal onto a high carrier frequency of the transmission signal, and the reception signal is demodulated with this frequency. The delayed signal is mixed with the frequency-modulated microwave signal to form a measured signal.

International Reference WO 83/0283 discloses a continuous wave radar apparatus with intermediate frequency formation wherein a superimposition oscillator is provided for mixing the transmission signal and the reception signal onto an intermediate frequency before the demodulation. The sensitivity of the radar apparatus is intended to be enhanced therewith.

SUMMARY OF THE INVENTION

An object of the present invention is to specify a radar distance sensor that enables a reliable measurement in the near range as well, given low technical outlay.

In general terms the present invention is an apparatus for distance measurement. A signal source generates a frequency-modulated microwave signal. An antenna arrangement emits the microwave signal and receives a signal reflected at an object. A modulation unit additionally modulates the microwave signal provided for emission and/or the reflected signal with a modulation signal. A mixer generates a mixed product of the microwave signal generated by the signal source and the reflected signal modulated by the modulation unit. A demodulation and filter unit removes a portion of this mixed product that lies below the lowest frequency of the modulation signal with a filter and processes a remaining part by mixing with the modulation signal to form a measured signal. The antenna arrangement is composed of an antenna that is provided for transmission and reception. A transmission/reception diplexer conducts the microwave signal from the signal source to the antenna and conducts the reflected signal from the antenna to the demodulation and filter unit. The modulation unit has a bidirectional modulator that is arranged between this transmission/reception diplexer and the antenna.

Advantageous developments of the present invention are as follows.

The modulation signal effects a phase modulation with a phase boost of 180°.

The modulation and filter unit has a high-pass filter and a further mixer. The high-pass filter is arranged between the mixer and this further mixer. This further mixer is arranged such that it can mix the signal coming from the high-pass filter with the modulation signal.

The demodulation and filter unit has a low-pass filter and a further mixer. This further mixer is arranged such that it can mix a signal coming from the mixer with the modulation signal. The signal supplied by the further mixer is supplied to the low-pass filter.

Given the inventive arrangement, a microwave radar is employed that works according to the initially described principle. An additional modulation of the microwave signal provided for emission or of the reception signal makes it possible to separate the payload signal from noise signal parts in a demodulation and filter unit that follows the reception mixer MI. To this end, a modulation unit is provided preceding the antenna in the arrangement illustrated in FIG. 2 in order to suitably modulate the signal to be emitted. The undesired noise signals produced by the components of the radar sensor itself are not modulated and can therefore be separated from the payload signal by filtering. This separation ensues before the demodulation by high-pass filtering and/or following the demodulation by low-pass filtering.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIGS. 3 through 7 show diagrams for explaining the functioning of the inventive apparatus.

DESCRIPTION OF THE PREFERRED EMBODIMENTS

Figure 1:
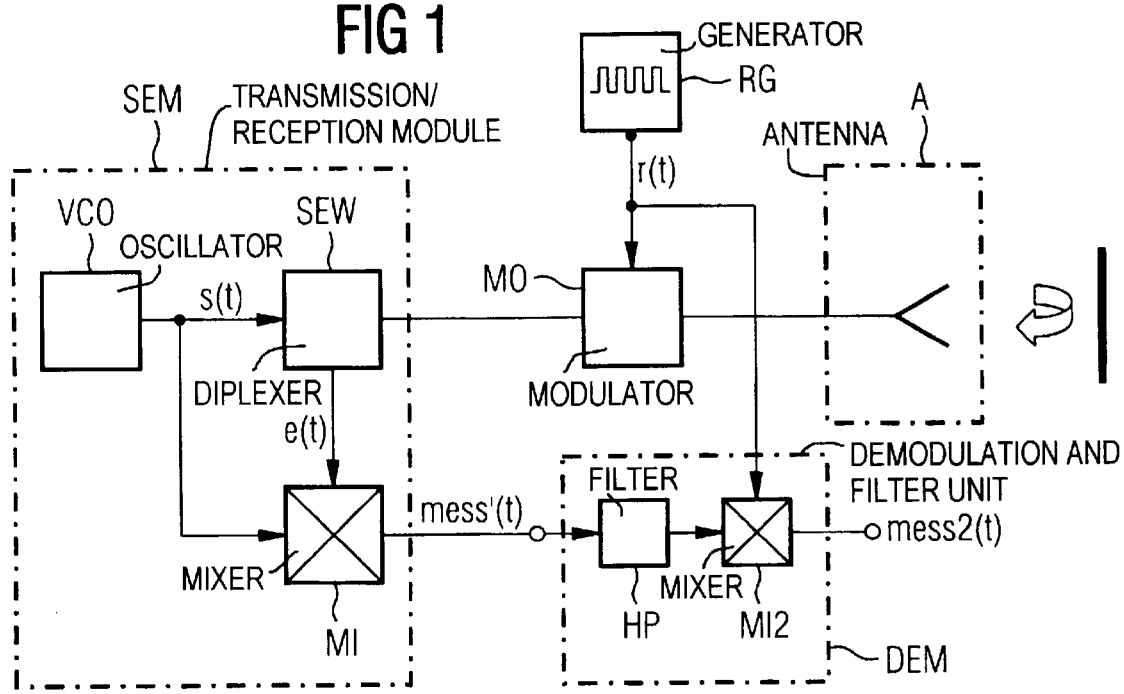
FIG. 1 shows an inventive arrangement that is described in greater detail below.

Given the arrangement of FIG. 1, the modulation unit is composed of a modulator MO into which a modulation signal provided for the modulation is supplied by a generator RG. In this simple arrangement of a monostatic radar system, only one antenna is provided for transmission and reception. The modulator is therefore fashioned as bidirectional modulator. The modulation of the microwave signal ensues here before the emission and after the reception. Instead, separate signal paths could be provided, so that the modulation ensues only before the emission or only after the reception of the microwave signal. In particular, such an arrangement can be fashioned as bistatic radar system with separate signal paths for transmission and reception wherein separate antennas are utilized for transmission and reception. What is thereby to be understood by the antenna A below is either a single antenna, as in the described example, or an antenna arrangement having separate transmission and reception antennas.

The invention arrangement therefore divides into a transmission/reception module SEM illustrated at the left in the diagram in FIG. 1, said modulation unit MO, the antenna arrangement A and a demodulation and filter unit that is provided for filtering the unwanted noise signal parts out of the resulting, raw measured signal mess' (t) and generating the measured signal provided for the evaluation by suitable conversion onto a low frequency.

Figure 2:
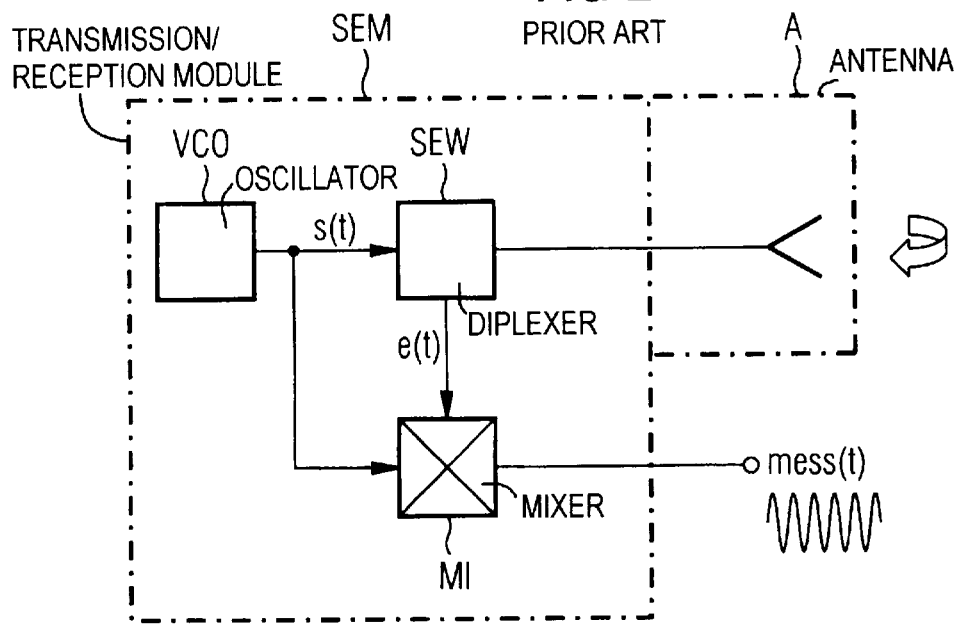
FIG. 2 shows a distance sensor according to the prior art.
Figure 7:
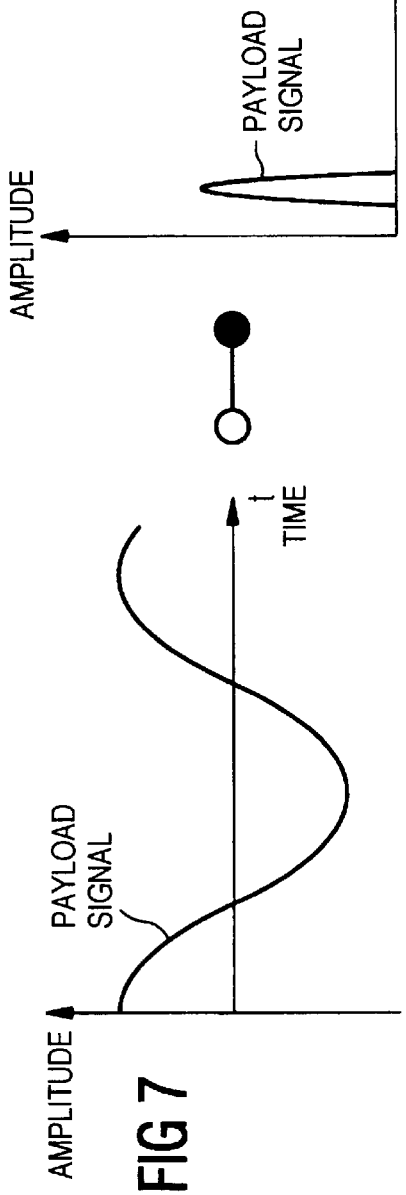

The transmission/reception module SEM in the exemplary embodiment of FIG. 1 is composed of the oscillator VCO, which can preferably be electronically set (tuned) to a specific microwave frequency. A transmission/reception diplexer SEW is also provided; this, as initially described, can be formed by a circulator or directional coupler. This transmission/reception diplexer is provided for conducting the microwave signal supplied by the oscillator VCO to the antenna and blocking it from a mixer MI and for conducting a reflection signal e (t) coming from the antenna to the mixer MI in which this reflected signal is mixed with the signal s (t) supplied by the oscillator, i.e. multiplied such that a demodulation of the frequency difference affected by the running time of the reflected signal ensues. This demodulation can be undertaken by the simple components entered in FIG. 1. However, it also possible to supplement or to replace the transmission/reception module by further components within the scope of the invention that are employed for radar distance sensors given arrangements according to FIG. 2. The transmission signal generated by the oscillator VCO is preferably linearly frequency modulated. Typical values of the signal are a center frequency of, for example, 24.1 Ghz, a frequency boost of 200 MHZ and a time interval for the sweep of the frequency between extreme values of 1 ms. A further component is provided for this modulation in the transmission/reception module. A compensation of a modulation that was not ideally undertaken can also be provided.

The modulation unit that, for example as shown in FIG. 1, can be formed by a modulator MO and a generator RG is located therebetween regardless of the exact embodiment of the transmission/reception module and the antenna arrangement. For example, this generator RG supplies a square-wave modulation signal r (t) (typical frequency of 1 through 10 MHZ). The radar signal and, thus, the measured signal as well is therefore correspondingly modulated. Fundamentally, different modulation methods can be applied at this point; for reasons of better sensitivity, however, a square-wave phase modulation with a phase boost of 180° (for forward and return path) is to be preferred. An amplitude-modulation or frequency-modulation with an adequately high frequency can also be employed.

After the emission of the radar signal and the reflection at the target illustrated at the right in FIG. 1 by a vertical beam—symbolized by the curved arrow—, the reflected radar signal e (t) is supplied to the transmission/reception module and is further-processed thereat in a traditional way to form a raw measured signal mess' (t). In the described example, this occurs by mixing with the signal s (t) supplied by the oscillator VCO in the mixer MI. In the following demodulation and filter unit, the low-frequency part of the measured signal is filtered out, i.e. removed. This occurs, for example, with a high-pass filter HP whose limit frequency is lower than the lowest frequency of the modulation signal supplied by the generator RG. A measured signal from which the low-frequency noise parts of the radar sensor are eliminated therefore pends at the output of the high-pass filter HP. This measured signal can then be demodulated, for example with a second mixer MI2, to form a measured signal mess2 (t) by multiplication with the modulation signal r (t) supplied by the generator RG. With the assistance, for example, of a digital computer, the precise distance to the target can then be calculated from this measured signal.

FIGS. 3 through 7 show diagrams that explain the described functioning of the inventive apparatus. The left-hand side shows a respective diagram wherein the payload signal and the noise signal are entered over the time. In the diagram at the respectively right-hand side, the amplitudes of the payload signal and of the noise signal are entered over the frequency. The transition from one presentation into the other occurs by Fourier transformation. Given lack of a further modulation, the frequencies of the payload signal and occurring noise signals are in close proximity, as shown in FIG. 3. In FIG. 4, the useful signal with the square-wave phase modulation with a phase boost of 180° is shown in the left-hand diagram. Due to the high, additional modulation frequency, the frequency parts of the payload signal are noticeably higher than the frequencies of the noise signals, as schematically shown in the right-hand diagram of FIG. 4. The low-frequency part can therefore be eliminated in the high-pass filter HP in the demodulation and filter unit DEM (see FIGS. 1 and 5). The measured signal is generated in the second mixer MI2 by multiplication with the modulation signal r (t) (see FIG. 7).

Figure 8:
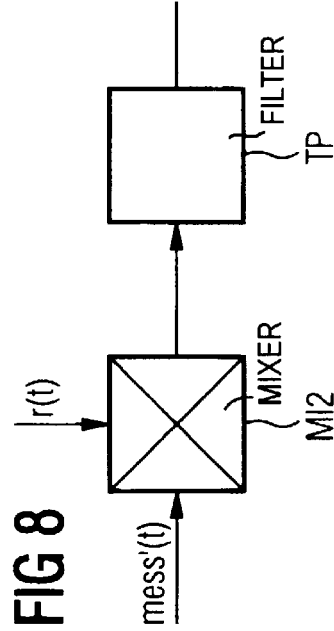

Alternatively, the raw measured signal mess' (t) can be modulated first with the modulation signal r (t) in the mixer MI2. The payload signal is thereby demodulated to form the actual measured signal; the low-frequency noise signal, by contrast, is modulated onto the fundamental frequency of the modulation signal (FIG. 6) and is removed by following low-pass filtering FIG. 7). FIG. 8 shows a demodulation and filter unit for this alternative embodiment of the apparatus.

Figure 9:
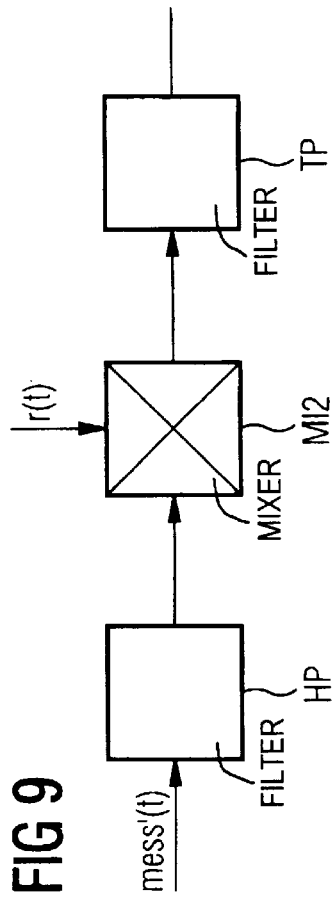
FIGS. 8 and 9 show alternative developments of the demodulation and filter unit that is provided.

The raw measured signal mess' (t) supplied by the first mixer MI is thereby directly supplied to the second mixer MI2 and, after mixing with the modulation signal r (t), is conducted to a low-pass filter TP. As a further alternative, both a high-pass filtering preceding the second mixer as well as a low-pass filtering following the second mixer can be provided according to FIG. 9.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. An apparatus for distance measurement, comprising:
   a signal source for generating a frequency-modulated microwave signal;
   an antenna arrangement for emitting the microwave signal and for receiving a signal reflected at an object;
   a modulation unit for additionally modulating the microwave signal provided for emission and/or the reflected signal with a modulation signal;
   a mixer for generating a mixed product of the microwave signal generated by the signal source and the reflected signal modulated by the modulation unit; and
   a demodulation and filter unit for removing a portion of the mixed product that lies below a lowest frequency of the modulation signal with a filter and for processing a remaining part of the mixed product by mixing with the modulation signal to form a measured signal;
   the antenna arrangement being composed of an antenna that is provided for transmission and reception;
   a transmission/reception diplexer for conducting the microwave signal from the signal source to the antenna and for conducting the reflected signal from the antenna to the demodulation and filter unit; and
   the modulation unit has a bidirectional modulator that is arranged between this transmission/reception diplexer and the antenna.

2. The apparatus according to claim 1, wherein the modulation signal effects a phase modulation with a phase boost of 180°.

3. The apparatus according to claim 1,
   wherein the modulation and filter unit have a high-pass filter and a further mixer;
   wherein the high-pass filter is arranged between the mixer and this further mixer; and
   wherein the further mixer is arranged such that the further mixer mixes the signal coming from the high-pass filter with the modulation signal.

4. The apparatus according to claim 1,
   wherein the demodulation and filter unit has a low-pass filter and a further mixer;
   the further mixer being arranged such that the further mixer mixes the signal coming from the mixer with the modulation signal; and
   wherein the signal supplied by the further mixer is supplied to the low-pass filter.

* * * * *